US010252561B2

(12) United States Patent
Richert et al.

(10) Patent No.: US 10,252,561 B2
(45) Date of Patent: Apr. 9, 2019

(54) SECURITY ELEMENTS AND METHOD FOR THEIR MANUFACTURE

(71) Applicant: BASF SE, Ludwigshafen (DE)

(72) Inventors: Michelle Richert, Illzach (FR); Oliver Seeger, Mannheim (DE); Nikolay A. Grigorenko, Möhlin (CH)

(73) Assignee: BASF SE, Ludwigshafen am Rhein (DE)

( * ) Notice: Subject to any disclaimer, the term of this patent is extended or adjusted under 35 U.S.C. 154(b) by 66 days.

(21) Appl. No.: 14/891,528

(22) PCT Filed: May 16, 2014

(86) PCT No.: PCT/EP2014/060148
§ 371 (c)(1),
(2) Date: Nov. 16, 2015

(87) PCT Pub. No.: WO2014/187750
PCT Pub. Date: Nov. 27, 2014

(65) Prior Publication Data
US 2016/0101642 A1   Apr. 14, 2016

(30) Foreign Application Priority Data
May 21, 2013   (EP) .................................... 13168545

(51) Int. Cl.
| B42D 25/29 | (2014.01) |
| B42D 25/364 | (2014.01) |
| B42D 25/328 | (2014.01) |
| B42D 25/373 | (2014.01) |
| B42D 25/24 | (2014.01) |
| B42D 25/30 | (2014.01) |
| B42D 25/40 | (2014.01) |
| C09D 7/00 | (2018.01) |
| C09D 101/18 | (2006.01) |
| C09D 5/29 | (2006.01) |
| B41M 3/14 | (2006.01) |
| C08K 3/08 | (2006.01) |
| B32B 7/02 | (2006.01) |
| B32B 9/00 | (2006.01) |
| C08L 101/00 | (2006.01) |
| G07D 7/00 | (2016.01) |
| G09F 3/00 | (2006.01) |
| C09D 5/00 | (2006.01) |

(52) U.S. Cl.
CPC .............. *B42D 25/29* (2014.10); *B41M 3/14* (2013.01); *B41M 3/148* (2013.01); *B42D 25/328* (2014.10); *B42D 25/364* (2014.10); *B42D 25/373* (2014.10); *C08K 3/08* (2013.01); *C09D 5/00* (2013.01); *C09D 5/29* (2013.01); *C09D 101/18* (2013.01); *C08K 2003/0806* (2013.01)

(58) Field of Classification Search
CPC .... B42D 25/364; B42D 25/373; B42D 25/29; B42D 25/328; B41M 3/14; B41M 3/148; C08K 3/08; C09D 5/29
See application file for complete search history.

(56) References Cited

U.S. PATENT DOCUMENTS

| 3,862,333 | A | 1/1975 | Chalupa et al. |
| 4,151,175 | A | 4/1979 | Crivello et al. |
| 4,399,071 | A | 8/1983 | Crivello et al. |
| 4,694,029 | A | 9/1987 | Land |
| 4,950,581 | A | 8/1990 | Koike et al. |
| 5,668,192 | A | 9/1997 | Castellanos et al. |
| 5,780,629 | A | 7/1998 | Etzbach et al. |
| 6,136,225 | A | 10/2000 | Meyer et al. |
| 6,291,540 | B1 | 9/2001 | Priou et al. |
| 6,306,555 | B1 | 10/2001 | Schulz et al. |
| 6,605,235 | B1 | 8/2003 | Meyer et al. |
| 6,732,961 | B2 | 5/2004 | Leigeber et al. |
| 7,033,653 | B2 | 4/2006 | Kuntz et al. |
| 7,264,748 | B2 | 9/2007 | Leyrer et al. |
| 7,670,505 | B2 | 3/2010 | Enger et al. |
| 7,728,931 | B2 | 6/2010 | Hoffmuller |
| 8,454,861 | B2 | 6/2013 | Krietsch et al. |
| 8,993,219 | B2 | 3/2015 | Richert et al. |
| 2007/0054122 | A1 | 3/2007 | Paisner et al. |
| 2008/0295646 | A1 | 12/2008 | Mirkin et al. |

(Continued)

FOREIGN PATENT DOCUMENTS

| CN | 1625592 A | 6/2005 |
| DE | 199 17 067 A1 | 10/2000 |

(Continued)

OTHER PUBLICATIONS

International Search Report for PCT/EP2014/060148 dated Jul. 15, 2014.

*Primary Examiner* — Kregg T Brooks

(74) *Attorney, Agent, or Firm* — Drinker Biddle & Reath LLP

(57) ABSTRACT

The present invention relates to complex security elements based on liquid crystal coatings which are subsequently coated with specific metallic nano-shaped metal particles, a method for their manufacture, in particular on a glass, paper or on a plastic substrate and a security product obtainable using the security element. The security element may contain additionally an embossed surface relief microstructure, especially an optically variable image (an optically variable device, OVD), such as a hologram. A further aspect of the invention is the use of such a security element for the prevention of counterfeit or reproduction of a document of value.

18 Claims, No Drawings

(56) References Cited

U.S. PATENT DOCUMENTS

| | | | |
|---|---|---|---|
| 2009/0115185 A1* | 5/2009 | Hoffmuller | B42D 25/29 283/85 |
| 2015/0158323 A1 | 6/2015 | Richert et al. | |
| 2015/0241845 A1 | 8/2015 | Richert et al. | |

FOREIGN PATENT DOCUMENTS

| | | |
|---|---|---|
| DE | 102008062169 A1 | 6/2009 |
| EP | 0562897 A1 | 9/1993 |
| EP | 0624826 A1 | 11/1994 |
| EP | 0 739 403 A1 | 10/1996 |
| EP | 0 847 432 A2 | 6/1998 |
| EP | 1 078 975 A1 | 2/2001 |
| EP | 1669213 A1 | 6/2006 |
| JP | H10301276 A | 11/1998 |
| RU | 2377132 C2 | 12/2009 |
| WO | WO-90/01512 A1 | 2/1990 |
| WO | WO-95/16007 A1 | 6/1995 |
| WO | WO-96/02597 A2 | 2/1996 |
| WO | WO-97/00600 A2 | 1/1997 |
| WO | WO-98/46647 A1 | 10/1998 |
| WO | WO-03064559 A1 | 8/2003 |
| WO | WO-2004/089813 A2 | 10/2004 |
| WO | WO-2005/124456 A2 | 12/2005 |
| WO | WO-2005/124460 A1 | 12/2005 |
| WO | WO-06/008251 A2 | 1/2006 |
| WO | WO-2006/099312 A2 | 9/2006 |
| WO | WO-08/055807 A2 | 5/2008 |
| WO | WO-2009056401 A1 | 5/2009 |
| WO | WO-2010/108837 A1 | 9/2010 |
| WO | WO-2010096914 A1 | 9/2010 |
| WO | WO-2011064162 A2 | 6/2011 |
| WO | WO-2013186167 A2 | 12/2013 |
| WO | WO-2014041121 A1 | 3/2014 |
| WO | WO-2014187750 A1 | 11/2014 |
| WO | WO-2015049262 A1 | 4/2015 |

* cited by examiner

SECURITY ELEMENTS AND METHOD FOR THEIR MANUFACTURE

CROSS-REFERENCE TO RELATED APPLICATIONS

This application is a national stage application (under 35 U.S.C. § 371) of PCT/EP2014/060148, filed May 16, 2014, which claims benefit of European Application No. 13168545.5, filed May 21, 2013, both applications of which are incorporated herein by reference in their entirety.

The present invention relates to complex security elements based on liquid crystal coatings or films which are subsequently coated with specific metallic nano-shaped metal particles, a method for their manufacture, in particular on a glass, paper or plastic substrate and a security product obtainable using the security element. The security element may contain additionally an embossed surface relief microstructure, especially an optically variable image (an optically variable device, OVD), such as a hologram. A further aspect of the invention is the use of such a security element for the prevention of counterfeit or reproduction of a document of value.

BACKGROUND OF THE INVENTION

On heating, numerous compounds are not converted from the crystalline state with defined short-range and long-range order of the molecules directly into the liquid, unordered state, but rather pass through a liquid-crystalline phase in which the molecules are mobile but the molecular axes form an ordered structure. In this case, stretched molecules often form nematic liquid-crystalline phases which are characterized by long-range order of orientation by virtue of parallel arrangement of the longitudinal axes of the molecules. When such a nematic phase comprises chiral compounds or chiral molecular moieties, a chiral nematic or cholesteric phase can form, which is characterized by a helical superstructure. The lesser or greater the proportion of chiral compound or chiral molecular moiety in a given system, the greater or lesser is the pitch of the helical superstructure. In order that electromagnetic radiation of comparatively long wavelength, for example in the region of visible light or NIR radiation, can be reflected to a sufficient degree, the formation of maximum layer thicknesses of the chiral-nematic phase is required, which, however, is typically associated with an increase in the misorientation of the helical superstructure.

A cholesteric pitch p is defined as distance along the helical axis for 360° twist. The helical superstructure involves a change of refractive index from layer to layer and gives thus rise to interference effects. When ordinary white light is incident normally on a film of a cholesteric material with the helical axis perpendicular to the substrate, selective reflection of a finite wavelength band occurs in a manner analogous to the Bragg reflection. The reflected band is centered about a wavelength $\lambda_0$, which is related to the helical pitch length p of the phase and its average refractive index n by $\lambda_0 = np$. The light reflected is circularly polarized with the same sense of polarisation as the helical sense of the liquid crystal phase. Light circularly polarised with the opposite handedness is transmitted through the sample together with those wavelengths of not being reflected. As a result of the anisotropy of the system light experiences double refraction. The band width of the selectively reflected band is given by $\Delta\lambda = p\,\Delta n$. The angular dependence for an incidence and observation angle $\theta$ is given by $\lambda_q = \lambda_0 \cos\theta$. A cholesteric film thus shows a strong angle dependent color travel.

Owing to their remarkable optical properties, liquid-crystalline materials, especially nematic, chiral nematic or cholesteric materials, are of interest in optical or electrooptical applications among others. However, the temperature range in which the liquid-crystalline phase occurs is often outside the desired application temperature or it extends only over a small temperature interval.

Principals of the liquid crystal phase (mesophase) are, for example, outlined in G. W. Gray, P. A. Winsor, Liquid Crystals and Plastic Crystals, Ellis Horwood Limited, Chichester, 1974.

The chiral molecular moiety may be present either in the liquid-crystalline molecule itself or be added as a dopant to the nematic phase, which induces the chiral nematic phase. This phenomenon was investigated first in cholesterol derivatives (for example H. Baessler, M. M. Labes, J. Chem. Phys. 52, 631 (1970)). By changing the concentration of a chiral dopant, the pitch and hence the wavelength region of selectively reflected radiation of a chiral nematic layer can be varied.

When the intention is to fix the liquid-crystalline ordered structures in the solid state, there are various possibilities. In addition to glasslike solidification in the course of cooling from the liquid-crystalline state, there is the possibility of polymerization into polymeric networks or, in the case that the liquid-crystalline compounds comprise polymerizable groups, of polymerizing the liquid-crystalline compounds themselves.

Furthermore, maximum refraction of the liquid-crystalline materials and maximum birefringence of liquid-crystalline materials is often desirable.

By oligomerizing or polymerizing a polymerizable liquid-crystalline composition, it is possible to prepare oligomers or polymers which may in particular also be obtained in the form of a film, i.e. of a self-supporting layer of uniform thickness. This film may be disposed on such a substrate that suitable measures make possible easy removal and transfer to another substrate for permanent disposition. Such a film can be used, for example, in the field of film coating and in laminating processes.

Furthermore, such films, whose properties have been adapted to the particular end use, can be used in a wide variety of fields.

It is additionally possible to coat or print substrates by means of a polymerizable liquid-crystalline composition, by applying this composition to the substrate and subsequently polymerizing it.

With regard to the procedure for printing or coating substrates with liquid-crystalline materials, reference is made mutatis mutandis to the document WO 96/02597 A2. Furthermore, a polymerized layer which has been produced with the aid of such a procedure and partly or fully covers the original substrate surface should also be considered as a substrate, and so the production of multiply printed and/or coated substrates is also possible.

DETAILED DESCRIPTION OF THE INVENTION

The liquid-crystalline compositions of the instant invention may additionally also find use as a liquid-crystalline colorant or for producing liquid-crystalline colorants. The use as colorant is possible when the composition is already colored per se. This color may be based on interference effects of the chiral nematic phase present and/or on absorption effects of dyes and/or pigments additionally present. In addition, the composition irrespective of whether it is colored or not, may also serve for the production of colorants. With regard to the preparation of liquid-crystalline colorants and their use for printing or coating substrates, reference is made mutatis mutandis to the document WO 96/02597 A2.

A further use of liquid crystal materials is for the prevention of copying and forgery. The copying and forging or articles of value, such as banknotes, certificates, luxury and brand articles, causes enormous economic damage. In order to put a stop to or at least make life harder for the copiers and forgers, articles of value are regularly provided with forgeryproof markings. However, for most markings, it is merely a matter of time until a way is found to circumvent them. There is therefore a constant need for novel forgeryproof markers.

The term "liquid-crystal" is used in the context of the present invention both for nematic and for cholesteric phases, unless otherwise evident from the particular context.

It has now surprisingly been found that the over coating of liquid crystalline films or coatings with a specific metallic ink/coating containing nano shaped metal particles results in a color effect which makes the articles unexpectedly secure against forgery and counterfeit.

The present invention provides for a security element which can show an angle dependent color change (variation of color as a function of the viewing angle; flip/flop effect) as well as different colors in reflection and transmission, and, when used in printing holograms, results in (security) products which can show an angle dependent color change (flip/flop effect), different colors in reflection and transmission, an extremely bright OVD image and extremely strong rainbow effect, high purity and/or contrast.

For example, the so produced security element exhibits a gold color when viewed in direction of the metallic coating in reflection and a blue color in transmission. Viewed from the reverse side the blue color in transmission is unchanged, but in reflection an angle dependent color change can be seen, i.e. starting from green in face angle to blue in gracing angle. The variable color effect occurs on all substrates.

One aspect of the invention is a security element, comprising
a) a substrate
b) a coating on at least a portion of the substrate comprising at least one liquid crystal compound, the coating being applied
   on the reverse side of the substrate if the substrate is transparent or translucent or
   on the surface side if the substrate is transparent, translucent, reflective or opaque and
c) a further coating on at least a portion of the coating containing the liquid crystal compound or direct on the substrate if the coating containing the liquid crystal compound is placed on the reverse side of the substrate, the further coating comprising platelet shaped transition metal particles having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm.

In a specific embodiment of the invention the security element comprises
a) a transparent, translucent, reflective or opaque substrate
b) a coating on at least a portion of the substrate comprising at least one liquid crystal compound and c) a further coating on at least a portion of the coating containing the liquid crystal compound, the further coating comprising platelet shaped transition metal particles having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm.

The substrate may be transparent, translucent, reflective or opaque. Examples for suitable substrates are paper, plastic or glass or mixtures thereof.

A reflective substrate is, for example, metallized paper, glass or plastic.

The term translucent in the context of the invention means that the light transmitted is essentially scattered or diffuse.

Preferably the substrate is transparent or translucent.

As plastic substrate there come into consideration thermoplastic or crosslinked polymers. With respect to the thermoplastic or crosslinked polymer, a thermoplastic resin may be used, examples of which include, polyethylene based polymers, [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly (vinyl butyral) (PVB), poly(vinyl alcohol) (PVA), poly (vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN)], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins (crosslinked resins) such as resol type phenolic resin, a urea resin, a melamine resin, a polyurethane resin, an epoxy resin, an unsaturated polyester and the like.

Thermoplastic polymers are preferred, in particular transparent or translucent thermoplastic polymers. For example, the transparent or translucent substrate is selected from polyester, polyvinyl chloride (PVC), polyethylene, polycarbonate, polypropylene or polystyrene.

The paper substrate may be a banknote, an identification document like a passport, an identification card, a driver's license, a packaging material, e.g. a label, folding carton, paper bag for pharmaceuticals, apparel, software, cosmetic, tobacco or any other product to be decorated or prone to counterfeiting or forgery.

Suitable liquid crystal compounds are commercially available, for example, from BASF SE. The materials are described in EP 0 739 403, EP 0 847 432 or U.S. Pat. No. 7,670,505. Further suitable materials are disclosed in DE 199 17 067 and U.S. Pat. No. 6,732,961.

For example, the coating containing the liquid crystal compound is prepared according to the procedure given in EP 1 078 975.

The liquid crystal layer is prepared, for example, on a polyester substrate and is dried and crosslinked by UV radiation in the presence of a photoinitiator. The liquid crystal compound itself contains two ethylenically unsaturated groups, typically at both ends of the molecule.

Photopolymerisable liquid crystal compounds are used to fix the compound in its position by the use of a photoinitiator.

Typically the photoinitiator is selected from benzophenone, alpha-hydroxy ketone type compounds, alpha-alkoxy ketone type compounds, alpha-amino ketone type compounds, mono and bisacylphosphine oxide compounds, phenylglyoxylate compounds, oxim ester compounds and onium salt compounds (sulfonium salt compounds and iodonium salt compounds) and mixtures thereof.

For example the photoinitiator is selected from mono and bisacylphosphine oxide compounds, alpha-amino ketone type compounds, oxim ester compounds or mixtures thereof. These photoinitiators are widely items of commerce and for example available from BASF SE.

Preferred is a security element as described above wherein the substrate, the coating containing the liquid crystal compound, the further coating containing the metal particles or two or three thereof comprise additionally an embossed surface relief microstructure, especially an optically variable image (an optically variable device, OVD).

For example the substrate has been embossed with a surface relief microstructure, such as a grating or hologram.

In another embodiment the surface relief microstructure is embossed in the liquid crystal coating.

In a further embodiment the surface relief microstructure is embossed in the metallic coating.

Alternatively two surface relief microstructures may be embossed one in the substrate and the other in the liquid crystal coating or in the metallic coating.

In another alternative the surface relief microstructures are embossed in the liquid crystal coating and in the metallic coating.

Optical microstructured images are composed of a series of structured surfaces (surface relief microstructures). These surfaces may have straight or curved profiles, with constant or random spacing, and may even vary from nanometers to millimeters in dimension. Patterns may be circular, linear, or have no uniform pattern. Embossed patterns may comprise microstructures having dimensions in the range from about 0.01 microns to about 100 microns. Light interference patterns based on microstructures having dimensions in the range from about 0.1 microns to about 10 microns, preferably about 0.1 microns to about 1 microns. For example a Fresnel lens has a microstructured surface on one side and a planar surface on the other. The microstructured surface consists of a series of grooves with changing slope angles as the distance from the optical axis increases. The draft facets located between the slope facets usually do not affect the optical performance of the Fresnel lens.

The optical interference pattern can take various conventional forms including diffraction patterns such as diffraction gratings, refraction patterns, holographic patterns such as two-dimensional and three-dimensional holographic images, corner cube reflectors, Kinegram® devices (i.e., holograms with changing imagery as the angel of view is changed), Pixelgram® devices (i.e., a hologram with multiple holographic pixels arranged in a spatial orientation that generates one holographic image), zero order diffraction patterns, moire patterns, or other light interference patterns based on microstructures having dimensions in the range from about 0.1 microns to about 10 microns, preferably about 0.1 microns to about 1 microns, and various combinations of the above such as hologram/grating images, or other like interference patterns.

Such structures include, but are not limited to: (1) electron beam generated holograms: (2) dot matrix holograms; (3) computer generated holograms; (4) optically variable devices (OVDs); (5) diffractive optical variable devices (DOVIDs); (6) lenses, in particular micro lenses; (7) lenticular lenses; (8) non-reflective structures; (9) light management structures; (10) deep structures (e.g., structures that diffract only one wavelength at a very wide viewing angle, such as found in some butterflies and other insects); (11) radio frequency identification (RFID) antennas; (12) embossable computer chips; (13) retroreflective structures; (14) metallic-looking structures; ROVIDs (reflective optical variable devices).

The optically variable device (OVD) is, for example, a diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

In the security element described above the metal is selected from the group consisting of Cu, Ag, Au, Zn, Cd, Ti, Cr, Mn, Fe, Co, Ni, Ru, Rh, Pd, Os, Ir and Pt. Preferred is Cu and Ag, especially Ag.

In a specific embodiment of the present invention, platelet shaped transition metal particles are used having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm and comprising hexagonal and/or triangular and/or truncated triangular prisms, which prisms make up more than 20% of the total number of shaped transition metal particles. The production of the shaped transition metal particles is, for example, described in US2008/0295646, WO2004/089813, WO2006/099312, C. Xue et al., Adv. Mater. 19, 2007, 4071, WO02009056401 and WO2010/108837. The use of the platelet shaped transition metal particles for producing holograms is described in WO 2011/064162.

In a specific embodiment the particles exhibit surface plasmon resonance with an absorption peak in the visible or near infrared wavelength range.

The security element as described above includes a metallic coating, component c) comprising a binder selected from the group consisting of nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polyethyleneterephthalate, terpene phenol, polyolefin, silicone, cellulose, polyamide, polyester and rosin ester resins or is a photopolymerisable composition comprising at least one ethylenically unsaturated monomer and/or oligomer and at least one photoinitiator.

In a specific embodiment the binder of the metallic coating is nitrocellulose.

Preferred is a security element wherein the further coating, component c) is a photopolymerisable composition comprising at least one ethylenically unsaturated monomer and/or oligomer and at least one photoinitiator.

Typical useful classes of photoinitiators have already mentioned above in the context of polymerizing the liquid crystal layer.

In a preferred embodiment the photoinitiator is selected from mono and bisacylphosphine oxide compounds and mixtures thereof.

Alternatively the curable composition comprises a mixture of a mono, or a bisacylphosphine oxide compound with a benzophenone compound, an alpha-hydroxy ketone, alpha-alkoxyketone, or alpha-aminoketone compound.

The, at present most preferred photoinitiators are mono and bisacylphosphine oxide compounds. Mono and bisacylphosphine oxide compounds can be used alone. Alternatively, a mixture of a mono and a bisacylphosphine oxide compound can be used, or the mono and bisacylphosphine oxide compounds can be used in admixture with other photoinitiators, such as, for example, the benzophenone type, alpha-amino ketone type, alpha-hydroxy ketone type, ketal compounds, phenylglyoxylate compounds, oxime ester compounds or onium salt compounds, especially a benzophenone compound, an alpha-hydroxy ketone, alpha-alkoxyketone, or alpha-aminoketone compound, very especially a benzophenone compound, an alpha-hydroxy ketone, or alpha-alkoxyketone compound. An alpha-aminoketone compound can be used, alone or in mixtures with other photoinitiators, if yellowing is not an issue.

The aforementioned photoinitiators may also be used alone.

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are given below.

Specific examples are bis(2,4,6-trimethylbenzoyl)-phenylphosphine oxide (Irgacure®819); 2,4,6-trimethylbenzoyl-diphenyl-phosphine oxide (Darocur®TPO); ethyl (2,4,6 trimethylbenzoyl phenyl) phosphinic acid ester; (2,4,6-trim ethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl) phenylphosphine oxide with ethyl (2,4,6 trimethylbenzoyl phenyl) phosphinic acid ester, etc.

Examples of suitable benzophenone compounds useful in combination or alone are the following.

Specific examples are Darocur®BP (=benzophenone), Esacure TZT® available from Lamberti, (a mixture of 2,4,6-trimethylbenzophenone and 4-methylbenzophenone), 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methy-2-benzoylbenzoate, 4-(2-hydroxyethylthio)benzophenone, 4-(4-tolylthio)benzophenone, 4-benzoyl-N,N,N-trimethyl-benzenemethanaminium chloride, 2-hydroxy-3-(4-benzoyl-phenoxy)-N,N,N-trimethyl-1-propanaminium chloride monohydrate, 4-(13-acryloyl-1,4,7,10,13-pentaoxatridecyl) benzophenone, 4-benzoyl-N, N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenyl-sulfonyl)propan-1-one (Esacure®1001 available from Lamberti).

Specific examples of alpha-hydroxyketones useful in combination or alone are 1-hydroxy-cyclohexyl-phenyl-ketone (Irgacure®184) or Irgacur® 500 (a mixture of Irgacure®184 with benzophenone), 2-methyl-1-[4-(methylthio) phenyl]-2-morpholinopropan-1-one (Irgacure®907), 2-benzyl-2-dimethylamino-1-(4-morpholinophenyl)-butan-1-one (Irgacure®369), 2-dimethylamino-2-(4-methyl-benzyl)-1-(4-morpholin-4-yl-phenyl)butan-1-one (Irgacure®379), (3,4-dimethoxy-benzoyl)-1-benzyl-1-dimethylamino propane, 1-[4-(2-hydroxyethoxy)-phenyl]-2-hydroxy-2-methyl-1-propan-1-one (Irgacure®2959), 2,2-dimethoxy-1,2-diphenylethan-1-one (Irgacure®651), 2-hydroxy-2-methyl-1-phenyl-propana-1-one (Darocur®1173), 2-hydroxy-1-{4-[4-(2-hydroxy-2-methyl-propionyl)-benzyl]-phenyl}-2-methyl-propan-1-one (Irgacure®127), 2-hydroxy-1-{4-[4-(2-hydroxy-2-methyl-propionyl)phenoxy]-phenyl}-2-methyl-propan-1-one, Esacure KIP provided by Lamberti, 2-hydroxy-1-{1-[4-(2-hydroxy-2-methyl-propionyl)-phenyl]-1,3,3-trimethyl-indan-5-yl}-2-methyl-propan-1-one.

Irgacure® and Darocur® products are available from BASF SE.

Examples of suitable phenylglyoxylate compounds useful in combination or alone are oxophenyl-acetic acid 2-[2-(2-oxo-2-phenyl-acetoxy)-ethoxy]-ethyl ester (Irgacure®754), methyl α-oxo benzeneacetate.

Specific examples of oximesters useful in combination or alone are 1,2-octanedione 1-[4-(phenylthio)phenyl]-2-(O-benzoyloxime) (Irgacure® OXE01), ethanone 1-[9-ethyl-6-(2-methylbenzoyl)-9H-carbazol-3-yl]-1-(O-acetyloxime) (Irgacure® OXE02), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N1919), ethanone 1-[9-ethyl-6-nitro-9H-carbazol-]-1-[2-methyl-4-(1-methyl-2-methoxy) ethoxy)phenyl]-1-(O-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Specific examples of sulfonium salt compounds are for example Irgacure®270 (BASF SE); Cyracure® UVI-6990, Cyracure®UVI-6974 (Union Carbide), Degacure®KI 85

(Degussa), SP-55, SP-150, SP-170 (Asahi Denka), GE UVE 1014 (General Electric), SarCat®KI-85 (=triarylsulfonium hexafluorophosphate; Sartomer), SarCat® CD 1010 (=mixed triarylsulfonium hexafluoroantimonate; Sartomer); SarCat® CD 1011 (=mixed triarylsulfonium hexafluorophosphate; Sartomer), Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate (Irgacure® 250, BASF SE), 4-octyloxyphenylphenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. No. 4,151, 175, U.S. Pat. No. 3,862,333, U.S. Pat. No. 4,694,029, EP 562897, U.S. Pat. No. 4,399,071, U.S. Pat. No. 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello. Journal of Polymer Science, Part A: Polymer Chemistry, Vol. 37, 4241-4254 (1999).

In several cases it is advantageous in addition to the photoinitiator to employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

The photoinitiators described above are also suitable for polymerizing the liquid crystal composition in the case that the liquid-crystalline compounds comprise polymerizable groups.

In a specific embodiment the photoinitiator comprises an arylborate and a dye as sensitizer.

WO-A-2005/124460 and WO-A-2005/124456 disclose photopolymerizable compositions comprising an ethylenically unsaturated monomer, a photoinitiator system, in particular a borate photoinitiator, a triglyceride and preferably a co-initiator (sensitizer) which is usually a dye, as well as the use of such compositions for preparing refractive index images, in particular holograms. Further suitable borate photoinitiators not concretely mentioned in WO-A-2005/124460 and WO-A-2005/124456 are given below. The compositions may also contain one or more of the borate photoinitiators listed below (the numbers in brackets are CAS numbers):

N,N,N-tributyl-1-butanaminium butyltriphenylborate (120307-06-4)
N-ethyl-N-[4-[1,5,5-tris[4-(diethylamino)phenyl]-2,4-pentadien-1-ylidene]-2,5-cyclohexadien-1-ylidene]-ethanaminium butyltriphenylborate (141714-54-7)
N,N,N-trimethyl-methanaminium, butyltriphenylborate (117522-01-7)
N,N,N-tributyl-1-butanaminium, butyltri-1-naphthalenylborate (219125-19-6)
N,N,N-tributyl-1-butanaminium, tris(3-fluorophenyl)hexylborate (191726-69-9)
N,N,N-tributyl-1-butanaminium, tris(3-fluorophenyl)(phenylmethyl)borate (199127-03-2)
dimethyl-(2-oxo-2-phenylethyl)-sulfonium, butyltriphenylborate (153148-27-7)
N,N,N-tributyl-1-butanaminium, tris(5-fluoro-2-methylphenyl)hexylborate (225107-27-7)
1-heptyl-2-[3-(1-heptyl-1,3-dihydro-3,3-dimethyl-2H-indol-)-1-propen-1-yl]-3,3-dimethyl-3H-indolium, butyltriphenylborate (117522-03-9)
Butyltriphenyl-borate, lithium (65859-86-1)

Suitable sensitizing dyes are, for example, acridine orange, acriflavine, acriflavine hydrochloride, alizarin and the like.

When the metallic coating, component c) is a photopolymerisable composition, the binder composition may be already commercially available. However, it is also possible to prepare a composition from commercially available monomers/oligomers and photoinitiators. Examples of materials are given below. These materials can also be used as reactive diluents in the preparation of liquid crystal coatings/films.

The photopolymerisable materials are typically curable lacquers which are cured by ultraviolet (U.V.) light. UV curing lacquers are commercial products and can be obtained, for example, from BASF SE. Particularly suitable for the lacquers compositions are chemistries used in the radiation curable industries in industrial coatings and graphic arts. Particularly suitable are compositions containing one or several photoinitiators that will initiate polymerization of the exposed lacquer layer to UV radiation. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate. Examples of polyunsaturated compounds of relatively high molecular mass (oligomers) are acrylated epoxy resins, polyesters containing acrylate-, vinyl ether- or epoxy-groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the above-mentioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(p-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof.

Also suitable as polymerizable components are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-9-aminoethyl ether, diethylenetriamine, triethylenetetramine, di(β-aminoethoxy)- or di(β-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy)ethane, β-methacrylamidoethyl methacrylate and N[(β-hydroxyethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly(amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursors.

Examples of polymerizable components are also polymers or oligomers having at least two ethylenically unsaturated groups and at least one carboxyl function within the molecule structure, such as a resin obtained by the reaction of a saturated or unsaturated polybasic acid anhydride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from ShinNakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The photopolymerizable compounds are used alone or in any desired mixtures. It is preferred to use mixtures of polyol (meth)acrylates. A preferred composition comprises at least one compound having at least one free carboxylic group.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The unsaturated polymerizable components can also be used in admixture with nonphotopolymerizable, film-forming components. These may, for example, be physically drying polymers or solutions thereof in organic solvents, for instance nitrocellulose or cellulose acetobutyrate. They may also, however, be chemically and/or thermally curable (heat-curable) resins, examples being polyisocyanates, polyepoxides and melamine resins, as well as polyimide precursors. The use of heat-curable resins at the same time is important for use in systems known as hybrid systems, which in a first stage are photopolymerized and in a second stage are crosslinked by means of thermal aftertreatment.

The polymerizable compositions may additionally comprise a solvent. The solvent may be ester/alcohol blends and preferably normal propyl acetate and ethanol. More preferably, the ester/alcohol blend is in a ratio of between 10:1 and 40:1, even more preferably 20:1 to 30:1. The solvent used may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as toluene, and water.

Although water may be used as a diluent alone, it is used in most cases together with an organic solvent such as an alcohol. Water may also be used as a diluent alone or in combination with water soluble acrylates and photoinitiators A photoinitiator, or a mixture of photoinitiators is incorporated into the formulation/composition to initiate the UV-curing process.

The lamp used in the method and apparatus of the present invention has emission peak(s) in the UV-A range (400 nm to 320 nm) and short wavelength visible spectrum (400-450 nm). That is, the lamp has emission peak(s) in the range of from 320 to 450 nm.

UV radiation is generally classed as UV-A, UV-B, and UV-C as follows: UV-A: 400 nm to 320 nm UV-B: 320 nm to 290 nm UV-C: 290 nm to 100 nm.

When a transparent substrate is used, the type of lamp is generally not critical. For example high or medium pressure mercury lamps are sufficient.

Any ultraviolet light source may be employed as a radiation source, such as, a high or low pressure mercury lamp, a cold cathode tube, a black light, an ultraviolet LED, an ultraviolet laser, and a flash light.

Examples of lamps, which can be used in the process of the present invention are shown below:

Medium pressure mercury arcs are modified by the inclusion of metal halides in small proportions to vary the spectral output:

iron doped—spectral output shifted to 350-450 nm;
gallium doped—emits very little UV; emission in the violet and blue spectral regions (expected additional UV lines by doping a mercury arc with metal iodides at wavelength/nm: Gallium (Ga) 403, 417 and Iron (Fe) 358, 372, 37415, 382, 386, 388); and
Focussed Reflected Diode Array (FRDA) systems (igbtech GmbH), such as for example FRDA 202 having an emission peak around 400 nm. Multi-spectrum lamps can also be used.

Advantageously, a gallium, or iron doped medium pressure mercury arc is used in the context of the present invention to produce more efficiently UV-A (315-400 nm) or UV-B (280-315 nm) and to provide better radiant efficiency ranges and higher curing.

The curable/photopolymerisable composition may comprise various additives. Examples thereof include thermal inhibitors, light stabilisers, optical brighteners, fillers and pigments, as well as white and coloured pigments, dyes, antistatics, adhesion promoters, wetting agents, flow auxiliaries, lubricants, waxes, anti-adhesive agents, dispersants, emulsifiers, anti-oxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

The curable/photopolymerisable composition may comprise an epoxy-acrylate from the CRAYNOR® Sartomer Europe range, or the LAROMER® range available from BASF SE (10 to 60%) and one or several acrylates (monofunctional and multifunctional), monomers which are available from Sartomer Europe, or BASF SE (20 to 90%) and one, or several photoinitiators (1 to 15%) such as Irgacure® 819 (BASF SE) and a levelling agent such as BYK®361 (0.01 to 1%) from BYK Chemie.

Generally the photoinitiator is typically added in an amount of from 1% to 20%, preferably 3% to 10% by weight, based on the weight of the total photopolymerizable/curable composition.

When mixtures or sensitizers are used the above amounts apply to the total of components.

In a further embodiment of the present invention the photopolymerisable coating, component c) and the substrate, component a) and/or the liquid crystal coating can be coloured. Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Platelet like organic pigments, such as platelet like quinacridones, phthalocyanine, fluororubine, dioxazines, red perylenes or diketopyrrolopyrroles can advantageously be used as further component.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides. Examples of commercially available inorganic pigments are BAYFERROX® 3920, BAYFERROX® 920, BAYFERROX® 645T, BAYFERROX® 303T, BAYFERROX® 110, BAYFERROX® 110 M, CHROMOXIDGRUEN GN, and CHROMOXIDGRUEN GN-M.

Examples of dyes, which can be used, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

The metallic coating, component c) may be generally an ink or lacquer and may be deposited by means of gravure, flexographic, ink jet, offset and screen process printing as well as by coating processes. In lab scale experiments drawdowns with a wire bar or with a doctor blade are convenient.

Depending on the amount of solvent in the lacquer and depending on the printing process different dry coating thicknesses result. The weight ratio of metallic, particularly silver nano pigment to binder influences the resulting colors in transmittance and reflectance. Theoretically a pigment binder ratio (P:B) as given below leads to the outlined dry coating thickness.

|  | P:B ratio | | | |
| --- | --- | --- | --- | --- |
|  | 4:1 | 1:3 | 1:100 | 1:1000 |
| Coating thickness dry (micron) | 1.0 | 2.0 | 3.9 | 4.0 |

A UV coating thickness of between 1 and 4 micron is typical for the instant method.

Typically the metallic, particularly silver nano pigment to binder weight ratio is from 4:1 to 1:1000.

The coating compositions of component c) comprise a total content of shaped transition metal particles of from 0.1 to 90% by weight, preferably 1-20% by weight based on the total weight of the ink. The curable composition may additionally comprise a solvent. Typical solvents have already been mentioned. For example, the solvents may be ester/alcohol blends and preferably normal propyl acetate and ethanol. More preferably, the ester/alcohol blend is in a ratio of between 10:1 and 40:1, even more preferably 20:1 to 30:1. The solvent used in the curable composition may comprise any one or more of an ester, such as n-propyl acetate, iso-propyl acetate, ethyl acetate, butyl acetate; an alcohol, such as ethyl alcohol, methanol, methoxypropanol, industrial methylated spirits, isopropyl alcohol or normal propyl alcohol; a ketone, such as cyclohexanone, methyl ethyl ketone or acetone; an aromatic hydrocarbon, such as toluene, and water.

The platelet shaped (transition) metal particles may be used in combination with spherical (transition) metal particles, such as spherical (transition) metal particles having a diameter of ≤40 nm, especially ≤20 nm.

In another embodiment of the invention another metal pigment may be added. The metal pigment is a metal pigment produced by physical vapor deposition (PVD metal pigment). The operating range of vacuum deposition may be in the range of 5 to 50 nm, the preferred thickness of the metal particles is in the range of 8 to 21 nm. Preferably, the thickness of the metal pigment particles is less than 50 nm. More preferably, the thickness of metal pigment particle is less than 35 nm. More preferably still, the thickness of pigment particle is less than 20 nm. Even more preferably still, the thickness of pigment particle is in the range 5-18 nm.

If such metallic pigment mixtures are used the ratio between the metallic platelet pigment and the binder system is from 10:1 to 1:1000.

Preferred is a security element as described above wherein the liquid crystal compound is oligomer or polymer which has been polymerized/crosslinked by UV radiation in the presence of a photoinitiator.

A further aspect of the invention is a method for forming the above described security element, comprising the steps
a) depositing a coating on at least a portion of a substrate comprising at least one liquid crystal compound the coating being applied
on the reverse side of the substrate if the substrate is transparent or translucent or
on the surface side if the substrate is transparent, translucent, reflective or opaque and
b) a further coating on at least a portion of the coating containing the liquid crystal compound or direct on the substrate if the coating containing the liquid crystal compound is placed on the reverse side of the substrate,
the further coating comprising platelet shaped transition metal particles having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm.

Preferred is a method wherein the coating containing the liquid crystal compound, component a) has a thickness of from 0.1 µm to 100 µm in the dry or cured state.

Preferably the thickness is from 0.5 µm to 50 µm, in particular from 1 µm to 5 µm.

Preferred is a method wherein the coating containing the metal particles, component b) has a thickness of from 0.2 µm to 50 µm, preferably of from 0.3 urn to 6 µm and in particular from 1 µm to 4 µm in the dry or cured state.

Typically the security element formed shows different reflection colors on the surface and the reverse side of the substrate.

If the cholesteric liquid crystal layer is in between the viewer and the coating containing the metal particles (reverse side) an angle dependent color change upon viewing can be observed, i.e. from magenta to green or from green to blue. The color change is not limited to the visible electromagnetic spectrum, it can also be tuned on the UV- or NIR-spectra.

If the metal particle containing coating is in between the viewer and the cholesteric liquid crystal layer (front side) a metallic reflection color can be seen.

Depending on the exact particle size, particle to binder ratio and thickness of the coating the color varies from orange (particle size preferably 8-20 nm height and 15-40 nm diameter), magenta (particle size preferably 8-20 nm height and 30-70 nm diameter) or gold (particle size preferably 7-17 nm height and 50-120 nm diameter).

Furthermore, the security element shows a transmission color different from the reflection color of the metal particle containing coating. As an example a metal particle containing coating with a gold color in reflection shows a blue color in transmission.

The reflection and transmission color of the coating containing the metal particles vary also with respect to the pigment/binder ratio. Typically, pigment/binder ratios are between 10:1 to about 1:100. As an example, a blue in transmission and a gold in reflection can shift to a violet in transmission and a silver in reflection with changing the pigment/binder ratio.

Surprisingly, the security element shows different colors on both sides of the substrate, but stays at the same time transparent with an additional transmission color. Furthermore, although the security element stays transparent, the angle dependent colors of the liquid crystal containing coating become nearly independent from the substrate/underground. If a surface relief microstructure is applied, for example the surface relief microstructure forming means is a shim which is selected from the group consisting of a nickel sleeve; a nickel plate; an etched, or laser imaged metallic drum, or other materials mounted on an opaque cylinder or metal cylinder containing the optical variable device (OVD image) on the surface.

In many cases it is also possible to use a shim which is made from a thermoplastic or duroplastic polymer.

Preferably the shim is a nickel plate mounted on an opaque cylinder or metal cylinder and containing the OVD image on the surface.

Another aspect of the invention is a security product comprising a security element as described above, which includes banknotes, credit cards, identification documents like passports, identification cards, drivers licenses, or other verification documents, pharmaceutical apparel, software, compact discs, tobacco packaging and other products or packaging prone to counterfeiting or forgery.

Yet a further aspect is the use of the security element as described above for the prevention of counterfeit or reproduction, on a document of value, right, identity, a security label or a branded good.

The resulting security product containing the liquid crystal coating, the coating with metal platelets and optionally a surface relief microstructure may for example be overprinted by a clear or slightly colored coating. The coating may be a conventional solvent borne coating or a UV curable coating. Examples for conventional coatings and the components of a UV curable coating have already been given above. Examples for binders of solvent borne coatings are nitrocellulose, alkyd resins or polyacrylate resins. In the case of solvent borne coatings an additional heat drying step becomes necessary to evaporate the solvent.

The definitions and preferences given above apply equally for all aspects of the invention.

The following examples illustrate the invention.

Preparation of Silver Platelets for Application Examples 1 and 2

The preparation is carried out according to example 1 of WO 2011/064162. The precipitate is dispersed in any solvent of choice, and includes water, methanol, ethylacetate, cyclohexanone, methoxypropanol to obtain a dispersion containing 20% of silver platelets.

The thus obtained platelets are used in the application examples 1 and 2.

Preparation of Silver Platelets for Application Example 3

The preparation is carried out according to example 5 of WO 2011/064162. The precipitate is dispersed in any solvent of choice, and includes water, methanol, ethylacetate, cyclohexanone, methoxypropanol to obtain a dispersion containing 20% of silver platelets.

The thus obtained platelets are used in the application example 3.

APPLICATION EXAMPLES

Liquid crystal coatings are prepared in accordance with example 1 of EP 1 0789 75 BE on bioriented polyester-therephthalat (PET) substrate. A cholesteric coating material with optimized coloristic effect is used. The coating thickness is 3.0 µm. The color flop depends on the amount of chiral compound.

Example 1: Red-Green Liquid Crystal Flop Combined with a Gold in Reflexion and Blue in Transmission Metal Coating Blue gold ink preparation: 28.6 g of nitrocellulose (DHX 3/5 IPA, 70% solids (Nobel Enterprises, UK)) are slowly added to 71.4 g of ethyl acetate (99-100% rein, Brenntag) in a 250 ml glass bottle and gently stirred until complete dissolution at room temperature. Solid content measurements are then performed and a quantity of ethyl acetate is adjusted to achieve a value of 19.6% solid content in the varnish preparation. General procedure for metallic ink preparation: 10.0 g silver pigment dispersion (19.6% of the pigment particles obtained in ethylacetate) are added to 10 g above varnish in such a proportion as to adjust 1:1 the pigment to binder ratio. The obtained dispersion is stirred with a Dispermat at 800 rpm for 10 minutes affording a metallic ink which is coated by means of a wire bar 1 (6 micron wet film), on a film coated with liquid crystal and air dried.

Measurement in transmission between 400 nm and 1700 nm at 0° and 45° angle using a Zeiss MCS 501 spectrophotometer from 400 nm to 1020 nm and a Zeiss MCR511 spectrophotometer from 1020 nm to 1700 nm.

Red-Green Liquid Crystal Coating on Bi-Oriented PET Film

| CIELab-Transmission | L | a | b |
|---|---|---|---|
| 0° angle | 92.02 | −13.30 | −4.29 |
| 45° angle | 84.91 | 14.49 | −13.81 |

Red-Green Liquid Crystal Coating Overcoated with Blue in Transmission and Gold in Reflexion Metallic Ink on Bi-Oriented PET Film

| CIELab-Transmission | L | a | b |
|---|---|---|---|
| 0° angle | 4.97 | 57.17 | −61.21 |
| 45° angle | 3.93 | 52.2 | −56.6 |

Effect obtained: The transmission color of the metal coated liquid crystal film is deep blue at 0° and 45° angle.

The transmission color of the metal coating is dominant as the liquid crystal film is nearly colorless.

Coloristical measurement in reflexion on each side of the film of the Red-green liquid crystal coating overcoated with blue gold ink on bi-oriented PET film (Lumirror) using a Datacolor MultiFX10-CIELAB-Color data (NLD65/10°)

Measurement on Printed Side Over Black

| CIELab-Reflexion | L* | a* | b* |
| --- | --- | --- | --- |
| 25°/170° | 14.17 | 0.00 | 0.68 |
| 25°/140° | 17.26 | 0.42 | −2.35 |
| 45°/150° | 18.15 | 0.32 | −2.38 |
| 25°/120° | 19.44 | 0.05 | −2.44 |
| 75°/120° | 19.72 | −0.06 | −1.46 |
| 75°/90° | 19.99 | −0.03 | −1.17 |
| 45°/110° | 17.26 | −0.03 | −4.51 |
| 45°/90° | 16.18 | −.018 | −4.53 |
| 45°/60° | 16.16 | −0.17 | −4.32 |
| 45°/25° | 14.60 | 0.89 | −4.70 |

Effect obtained: No flop of the liquid crystal coating, the effect is metallic

Measurement on Printed Side Over White

| CIELab- Reflexion | L* | a* | b* |
| --- | --- | --- | --- |
| 25°/170° | 14.03 | 0.45 | −0.37 |
| 25°/140° | 17.43 | 3.07 | −7.31 |
| 45°/150° | 18.06 | 3.96 | −9.4 |
| 25°/120° | 19.81 | 5.50 | −12.28 |
| 75°/120° | 19.89 | 6.18 | −13.22 |
| 75°/90° | 20.43 | 6.69 | −13.60 |
| 45°/110° | 17.77 | 6.54 | −15.42 |
| 45°/90° | 16.67 | 7.00 | −16.26 |
| 45°/60° | 16.66 | 6.73 | −15.66 |
| 45°/25° | 14.87 | 5.60 | −12.56 |

Effect obtained: Very slight flop of the liquid crystal coating, the metallic effect is dominant Measurement on Reverse Side Over Black

| CIELab- Reflexion | L* | a* | b* |
| --- | --- | --- | --- |
| 25°/170° | 35.26 | −30.44 | 1.77 |
| 25°/140° | 41.10 | −29.55 | 19.15 |
| 45°/150° | 39.73 | −22.95 | 20.94 |
| 25°/120° | 31.88 | −0.08 | 13.67 |
| 75°/120° | 27.70 | 7.29 | 9.47 |
| 75°/90° | 25.44 | 6.47 | 6.30 |
| 45°/110° | 20.06 | 0.12 | 0.46 |
| 45°/90° | 15.15 | −1.01 | −4.62 |
| 45°/60° | 13.88 | −0.29 | −5.97 |
| 45°/25° | 12.75 | 7.83 | −5.83 |

Effect obtained: Red-Green flop of the liquid crystal coating

Measurement on Reverse Side Over White

| CIELab- Reflexion | L* | a* | b* |
| --- | --- | --- | --- |
| 25°/170° | 35.17 | −30.31 | 1.47 |
| 25°/140° | 41.12 | −28.31 | 16.15 |
| 45°/150° | 39.69 | −21.31 | 16.59 |
| 25°/120° | 32.02 | 2.76 | 5.46 |
| 75°/120° | 27.89 | 10.77 | −0.53 |
| 75°/90° | 25.74 | 10.89 | −4.99 |
| 45°/110° | 20.40 | 5.34 | −9.86 |
| 45°/90° | 15.63 | 6.14 | −16.04 |
| 45°/60° | 14.34 | 6.93 | −16.91 |
| 45°/25° | 13.07 | 12.39 | −13.95 |

Effect obtained: Red-Green flop of the liquid crystal coating

The coloristic effect obtained with the combination of a metallic coating (gold in reflexion) on a transparent substrate coated with a red green liquid crystal is a gold metallic color on the print side, a red-green color flop on the reverse side of the film and a deep blue color in transmission. The color variable effect of the liquid crystal is independent from the substrate when combined with the metallic coating.

Example 2: Green-Blue Liquid Crystal Flop Combined with a Gold in Reflexion and Blue in Transmission Metallic Coating Blue gold ink preparation is the same as in example 1. The ink is coated by means of a wire bar 1 (6 micron wet film), on a film coated with liquid crystal as given in example 1 and air dried.

Measurement in transmission between 400 nm and 1700 nm at 0° and 450 angle using a Zeiss MCS 501 spectrophotometer from 400 nm to 1020 nm and a Zeiss MCR511 spectrophotometer from 1020 nm to 1700 nm.

Green-Blue Liquid Crystal Coating on Hi-Oriented PET Film

| CIELab- Transmission | L | a | b |
| --- | --- | --- | --- |
| 0° angle | 86.69 | 23.14 | −12.18 |
| 45° angle | 92.46 | 6.57 | 8.81 |

Green-Blue Liquid Crystal Coating Overcoated with Blue in Transmission and Gold in Reflexion Metal Ink on Bi-Oriented PET Film

| CIELab- Transmission | L | a | b |
| --- | --- | --- | --- |
| 0° angle | 3.77 | 60.07 | −61.91 |
| 45° angle | 2.90 | 51.53 | −54.36 |

Effect obtained: The transmission color of the metallic coating on the liquid crystal film is deep blue at 0° and 45° angle. The transmission color of the metallic coating is dominant as the liquid crystal film is nearly colorless.

Coloristic measurement in reflexion of the green-blue liquid crystal overcoated with blue gold ink on bi-oriented PET film (Lumirror) using a Datacolor MultiFX10-CIELAB-Color data (NLD65/10°)

Measurement on Printed Side Over Black

| CIELab- Reflexion | L* | a* | b* |
| --- | --- | --- | --- |
| 25°/170° | 22.04 | −0.72 | 1.77 |
| 25°/140° | 23.14 | 0.67 | 1.15 |
| 45°/150° | 23.45 | 0.81 | 0.93 |
| 25°/120° | 22.91 | 0.93 | 0.38 |
| 75°/120° | 22.89 | 0.68 | 1.77 |
| 75°/90 | 22.68 | 0.56 | 1.44 |
| 45°/110° | 18.41 | 0.59 | −3.76 |
| 45°/90° | 16.05 | 0.16 | −4.71 |

-continued

| CIELab- Reflexion | L* | a* | b* |
|---|---|---|---|
| 45°/60° | 15.81 | 0.31 | −5.05 |
| 45°/25° | 14.25 | 1.27 | −5.12 |

Effect obtained: No flop of the liquid crystal coating, the effect is metallic

Measurement on Printed Side Over White

| CIELab- Reflexion | L* | a* | b* |
|---|---|---|---|
| 25°/170° | 22.02 | −0.70 | 1.70 |
| 25°/140° | 23.13 | 1.80 | −1.36 |
| 45°/150° | 23.38 | 2.36 | −2.40 |
| 25°/120° | 23.01 | 4.83 | −7.45 |
| 75°/120° | 22.94 | 5.44 | −8.21 |
| 75°/90° | 22.91 | 6.02 | −9.64 |
| 45°/110° | 18.64 | 5.87 | −12.78 |
| 45°/90° | 16.42 | 6.55 | −14.90 |
| 45°/60° | 16.13 | 6.46 | −14.71 |
| 45°/25° | 14.44 | 4.19 | −10.06 |

Effect obtained: Very slight flop of the liquid crystal coating, the metallic effect is dominant Measurement on Reverse Side Over Black

| CIELab- Reflexion | L* | a* | b* |
|---|---|---|---|
| 25°/170° | 28.32 | 15.19 | −25.92 |
| 25°/140° | 34.34 | 4.93 | −16.41 |
| 45°/150° | 33.41 | −0.22 | −11.73 |
| 25°/120° | 30.97 | −7.06 | 2.77 |
| 75°/120° | 29.82 | −6.89 | 5.79 |
| 75°/90° | 29.38 | −5.83 | 6.89 |
| 45°/110° | 20.64 | 1.54 | 0.15 |
| 45°/90° | 15.53 | 6.25 | −0.88 |
| 45°/60° | 15.08 | 6.30 | 1.04 |
| 45°/25° | 14.83 | 0.37 | 7.80 |

Effect obtained: Green-blue flop of the liquid crystal coating

Measurement on Reverse Side Over White

| CIELab- Reflexion | L* | a* | b* |
|---|---|---|---|
| 25°/170° | 28.13 | 15.13 | −25.84 |
| 25°/140° | 34.40 | 5.43 | −17.07 |
| 45°/150° | 33.09 | 0.86 | −13.14 |
| 25°/120° | 30.98 | −3.83 | −3.18 |
| 75°/120° | 29.60 | −2.65 | −2.73 |
| 75°/90° | 29.42 | −1.33 | −2.79 |
| 45°/110° | 20.86 | 6.18 | −8.80 |
| 45°/90° | 15.88 | 12.12 | −12.30 |
| 45°/60° | 15.39 | 12.05 | −10.75 |
| 45°/25° | 15.00 | 3.04 | 0.84 |

Effect obtained: Green-blue flop of the liquid crystal coating

The coloristic effect obtained with the combination of a metallic coating (blue in transmission and gold in reflexion) on a transparent substrate coated with a green-blue liquid crystal is a gold metallic color on the print side, a green-blue color flop on the reverse side of the film and a deep blue color in transmission.

The color variable effect of the liquid crystal is independent from the substrate when combined with a metallic coating.

Example 3: Green-Blue Liquid Crystal Film Combined with a Green in Reflexion and Magenta in Transmission Metallic Coating A metallic coating with a green color in reflexion and magenta color in transmission is coated on a green-blue liquid crystal coating on bi-oriented PET film (Lumirror).

Magenta green ink preparation: 16.5 g of nitrocellulose chips A 400 (Walsroder, 20% ATBC plasticizer) are slowly added to 20.0 g of ethyl acetate (99-100% rein, Brenntag) and 10.0 g Solvenon PM (BASF, 99.5% rein and 53.5 g ethanol (96% rein, Brenntag) in a 250 mL glass bottle and gently stirred until complete dissolution at room temperature. Solid content measurements are then performed and quantity of ethyl acetate is adjusted to achieve a value of 16.5% solid content in the varnish preparation. General procedure for metallic ink preparation: 10 g silver pigment dispersion (16.5% of the pigment particles obtained in ethylacetate) are added to 10 g above varnish in such a proportion as to adjust 1:1 the pigment to binder ratio. The obtained dispersion is stirred with a Dispermat at 800 rpm for 10 minutes affording a metallic ink which is coated by means of a wire bar 0 (4 micron wet ink thickness), on a film coated with liquid crystal and air dried.

Green-blue liquid crystal coating overcoated with magenta in transmission and green in reflexion metallic ink on Bi-oriented PET film Measurement in transmission between 400 nm and 1700 nm at 0° and 45° angle using a Zeiss MCS 501 spectrophotometer from 400 nm to 1020 nm and a Zeiss MCR511 spectrophotometer from 1020 nm to 1700 nm.

Blue-Green Liquid Crystal Coating on Bi-Oriented PET Film

| CIELab- Transmission | L | a | b |
|---|---|---|---|
| 0° angle | 86.69 | 23.14 | −12.18 |
| 45° angle | 92.46 | 6.57 | 8.81 |

Blue-green liquid crystal coated with magenta in transmission and green in reflexion ink.

Measurement in Transmission Between 400 nm and 1700 nm at 0° and 45° Angle

| CIELab- Transmission | L | a | b |
|---|---|---|---|
| 0° angle | 12.51 | 41.6 | 15.01 |
| 45° angle | 11.17 | 40.15 | 19.98 |

Effect obtained: The transmission color of the metal coated liquid crystal is shifted from pale reddish blue to strong magenta.

Coloristic measurement of the blue-green liquid crystal overcoated with magenta green metal ink on bi-Oriented PET film (Lumirror) using a Datacolor MultiFX10-CIELAB-Color data (NLD65/10°).

Measurement on Printed Side Over Black

| CIELab- Reflexion | L* | a* | b* |
|---|---|---|---|
| 25°/170° | 40.80 | 45.87 | −84.66 |
| 25°/140° | 57.38 | −2.77 | −74.21 |
| 45°/150° | 61.68 | −33.30 | −57.20 |
| 25°/120° | 65.30 | −88.25 | 4.66 |
| 75°/120° | 68.10 | −80.00 | 37.80 |

-continued

| CIELab- Reflexion | L* | a* | b* |
|---|---|---|---|
| 75°/90° | 65.61 | −59.05 | 45.21 |
| 45°/110° | 43.69 | −54.79 | 8.24 |
| 45°/90° | 20.95 | −7.51 | −1.28 |
| 45°/60° | 16.96 | 4.33 | −5.63 |
| 45°/25° | 16.51 | −0.62 | 1.03 |

Effect obtained: Strong green blue flop of the liquid crystal coating
Measurement on Printed Side Over White

| CIELab- Reflexion | L* | a* | b* |
|---|---|---|---|
| 25°/170° | 40.71 | 45.86 | −84.47 |
| 25°/140° | 57.61 | −2.13 | −74.23 |
| 45°/150° | 61.52 | −32.22 | −56.94 |
| 25°/120° | 65.61 | −86.47 | 4.77 |
| 75°/120° | 67.92 | −77.87 | 37.48 |
| 75°/90° | 65.98 | −57.62 | 45.18 |
| 45°/110° | 44.05 | −51.62 | 8.34 |
| 45°/90° | 21.75 | −2.76 | −0.92 |
| 45°/60° | 17.88 | 8.82 | −4.98 |
| 45°/25° | 17.23 | 3.37 | 1.62 |

Effect obtained: Strong green blue flop of the liquid crystal coating, independent of the white or black backing
Measurement on Reverse Side Over Black

| CIELab- Reflexion | L* | a* | b* |
|---|---|---|---|
| 25°/170° | 28.80 | −6.78 | −2.71 |
| 25°/140° | 32.81 | −8.64 | −2.78 |
| 45°/150° | 31.26 | −8.22 | −3.00 |
| 25°/120° | 27.50 | −6.59 | −3.49 |
| 75°/120° | 26.95 | −6.54 | −3.66 |
| 75°/90° | 25.49 | −5.76 | −4.17 |
| 45°/110° | 20.01 | −3.50 | −5.14 |
| 45°/90° | 17.70 | −2.33 | −6.27 |
| 45°/60° | 17.98 | −2.07 | −6.95 |
| 45°/25° | 17.43 | −2.07 | −6.98 |

Effect obtained: No flop of the liquid crystal coating, the metallic effect is dominant
Measurement on Reverse Side Over White

| CIELab- Reflexion | L* | a* | b* |
|---|---|---|---|
| 25°/170° | 29.02 | −6.66 | −2.69 |
| 25°/140° | 32.80 | −7.23 | −2.76 |
| 45°/150° | 31.90 | −6.70 | −2.73 |
| 25°/120° | 27.73 | −3.60 | −3.13 |
| 75°/120° | 27.66 | −3.52 | −3.35 |
| 75°/90° | 25.90 | −2.17 | −3.90 |
| 45°/110° | 20.66 | 0.58 | −4.63 |
| 45°/90° | 18.50 | 2.21 | −5.49 |
| 45°/60° | 18.79 | 2.48 | −6.51 |
| 45°/25° | 18.01 | 1.35 | −6.23 |

Effect obtained: No flop of the liquid crystal coating, the metallic effect is dominant
When coating liquid crystals with a metal ink, the color flop of the liquid crystal is independent of the backing

The invention claimed is:
1. A security element comprising:
a) a substrate with a surface side and a reverse side;
b) a coating on at least a portion of the substrate, the coating including at least one liquid crystal compound, wherein the coating is applied on the reverse side of the substrate, or on the surface side and wherein the substrate is transparent or translucent and;
c) another coating on at least a portion of the coating that includes the liquid crystal compound, or on the surface side of the substrate if the coating that includes the liquid crystal compound is placed on the reverse side of the substrate,
the another coating comprising platelet shaped transition metal particles having a longest dimension of edge length of from 5 nm to 1000 nm, and a thickness of from 2 nm to 100 nm;
wherein the angle dependent colors of the liquid crystal containing coating are independent from the substrate
wherein the liquid crystal coating has an angle dependent color shift effect; and
wherein the angle dependent color shift effect of the liquid crystal coating is more equally visible over black and white substrate than the liquid crystal coating in the absence of the another coating comprising platelet shaped transition metal particles.

2. A security element according to claim 1, wherein
the coating is applied to the surface side of the substrate, and
the another coating is applied on at least a portion of the coating containing the liquid crystal compound, the another coating having a longest dimension of edge length of from 5 nm to 600 nm, and a thickness of from 2 to 40 nm.

3. The security element according to claim 2, wherein the transition metal is selected from Cu or Ag.

4. The security element according to claim 1 further comprising an embossed surface relief microstructure.

5. The security element according to claim 1, wherein the transition metal is selected from the group consisting of Cu, Ag, Au, Zn, Cd, Ti, Cr, Mn, Fe, Co, Ni, Ru, Rh, Pd, Os, Ir and Pt.

6. The security element according to claim 1, wherein the shaped transition metal particles are of hexagonal prisms, triangular prisms, truncated triangular prisms, or any combination thereof, where the prisms account for greater than 20% of the total number of shaped transition metal particles.

7. The security element according to claim 1, wherein the another coating comprises a binder selected from the group consisting of nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polyethyleneterephthalate, terpene phenol, polyolefin, silicone, cellulose, polyamide, polyester and rosin ester resins.

8. The security element according to claim 1, wherein the another coating comprises a photopolymerisable composition comprising at least one ethylenically unsaturated monomer and/or oligomer, and at least one photoinitiator.

9. The security element according to claim 1 wherein the substrate comprises glass, plastic or paper or mixtures thereof.

10. The security element according to claim 1 wherein the liquid crystal compound is an oligomer or polymer which has been polymerized/crosslinked by UV radiation in the presence of a photoinitiator.

11. A method according to claim 1 wherein the coating including the liquid crystal compound has a thickness of from 0.1 μm to 100 μm in the dry or cured state.

12. A method according to claim 1 wherein the another coating has a thickness of from 0.2 μm to 50 μm in the dry or cured state.

13. A method for forming the security element of claim 1, comprising:
   providing the substrate;
   depositing the coating on at least a portion of the substrate, the coating including at least one liquid crystal compound the coating being applied on the reverse side of the substrate if the substrate is transparent or translucent, or on the surface side if the substrate is transparent, translucent, reflective or opaque; and
   depositing another coating on at least a portion of the coating containing the liquid crystal compound, or if the coating containing the liquid crystal compound is placed on the reverse side then depositing the another coating on the substrate.

14. A method according to claim 13 wherein the coating including the liquid crystal compound has a thickness of from 0.1 μm to 100 μm in the dry or cured state.

15. A method according to claim 13 wherein the another coating has a thickness of from 0.2 μm to 50 μm in the dry or cured state.

16. A security product comprising a security element according to claim 1, which includes banknotes, credit cards, identification documents like passports, identification cards, drivers licenses, or other verification documents, pharmaceutical apparel, software, compact discs, tobacco packaging and other products or packaging prone to counterfeiting or forgery.

17. The security element of claim 1, wherein the substrate is transparent.

18. A security element consisting of:
   a) a substrate with a surface side and a reverse side;
   b) a coating on at least a portion of the substrate, the coating including at least one liquid crystal compound, wherein the coating is applied on the reverse side of the substrate or on the surface side and wherein the substrate is transparent;
   c) another coating on at least a portion of the coating that includes the liquid crystal compound, or on the surface side of the substrate if the coating that includes the liquid crystal compound is placed on the reverse side of the substrate,
   the another coating comprising platelet shaped transition metal particles having a longest dimension of edge length of from 5 nm to 1000 nm, and a thickness of from 2 nm to 100 nm; and
   d) optionally an embossed surface relief microstructure;
   wherein the angel dependent colors of the liquid crystal containing coating are independent from the substrate
   wherein the liquid crystal coating has an angle dependent color shift effect; and
   wherein the angle dependent color shift effect of the liquid crystal coating is more equally visible over black and white substrate than the liquid crystal coating in the absence of the another coating comprising platelet shaped transition metal particles.

\* \* \* \* \*